April 16, 1946.  V. L. RONCI  2,398,449
METHOD OF MAKING HERMETIC SEALS
Filed July 9, 1941
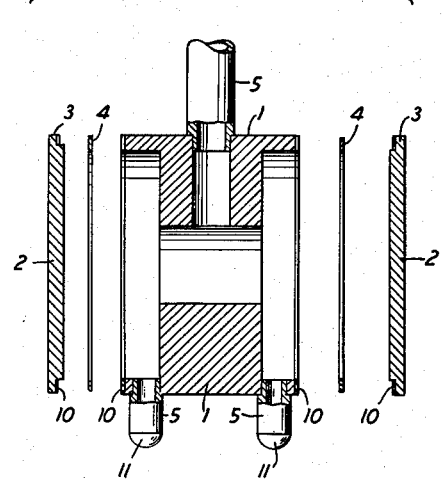
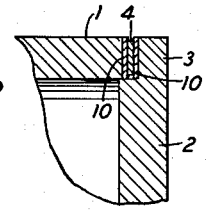
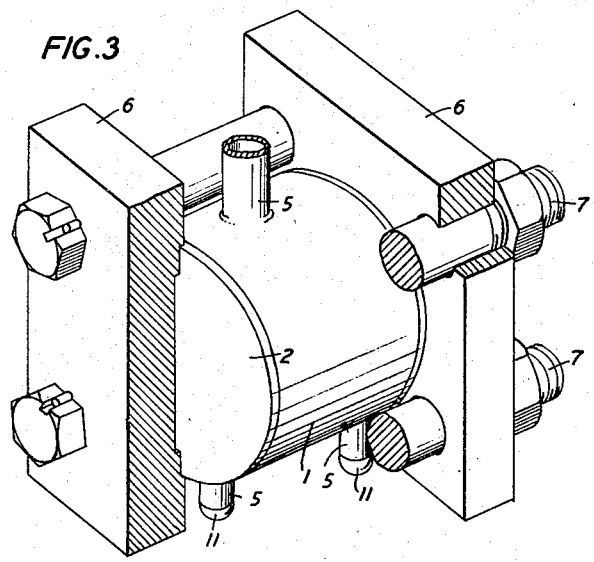
INVENTOR
V. L. RONCI
BY
Walter C. Kiesel
ATTORNEY Patented Apr. 16, 1946

2,398,449

UNITED STATES PATENT OFFICE 2,398,449

METHOD OF MAKING HERMETIC SEALS

Victor L. Ronci, Brooklyn, N. Y., assignor to Bell Telephone Laboratories, Incorporated, New York, N. Y., a corporation of New York Application July 9, 1941, Serial No. 401,627

3 Claims. (Cl. 113—112)

This invention relates to hermetic seals between metallic members and to methods of fabricating such seals. More particularly, it relates to hermetic seals or joints between metallic members constituting portions of a container, such as the enclosing vessel of an electron discharge device, and to methods of making such seals or joints.

Electron discharge devices comprise, in general, an electrode structure or system mounted within a highly evacuated enclosing vessel, which may be of glass, partly of glass and partly of metal or mainly of metal. Attainment of the requisite high vacuum in the vessel entails, in the fabrication of the device and more particularly during the pumping or evacuation process, heating of the device to elevated temperatures, for example of the order of 450° C., in order to remove occluded gases from the internal elements and the enclosing vessel of the device. In the usual method of manufacture the enclosing vessel and the mounting of the electrodes therein is completed prior to the initiation of the pumping or evacuation process.

In the construction of devices the enclosing vessel of which includes two or more metallic portions joined to one another, difficulty is encountered in producing joints between the members which not only will be hermetic but also will remain airtight during the pumping or evacuation process and which, furthermore, will not involve the use of materials that may distill out of the joints at the temperatures encountered during the pumping process and contaminate the internal elements of the device. For example, in constructions wherein the enclosing vessel comprises metallic portions joined by an ordinary soldering or brazing process, at the temperatures employed in the pumping or evacuation process the solder or brazing material may soften, whereby the airtightness of the joint is destroyed, and, furthermore, at the temperatures and at the differential in pressures between the atmosphere outside of the device and those extant within the vessel, ingredients of the solder or brazing material distill into the vessel. If brazing materials having sufficiently high melting points to withstand the temperatures encountered in the pumping or evacuation process are employed, the brazing temperatuers required are so high as to affect adversely the metallic members joined and thereby to render these members unsuitable for the intended use thereof. Also, brazing may result in oxidation of the metal portions and thus prevent the attainment of a hermetic seal.

One object of this invention is to produce an improved hermetic seal between metallic members constituting portions of an evacuated container or vessel.

Another object of this invention is to expedite and simplify the fabrication of electron discharge devices having enclosing vessels constituted at least in part by metallic members hermetically joined together.

In accordance with one feature of this invention, metallic members constituting portions of an enclosing vessel of an electron discharge device are joined together in such manner and through the intermediary of such materials that a strong airtight seal is produced therebetween without distillation of material into the enclosing vessel and at a temperature sufficiently low to result in no deleterious affecting of the metallic members. More specifically, in accordance with one feature of this invention, an intermediate layer of metal is utilized between the metallic members to be joined, the metal having definite characteristics, and the hermetic seal is formed concurrently with the evacuation of the enclosing vessel.

The characteristics of the intermediate layer of metal employed in accordance with a feature of this invention are a low melting point, a high boiling point and a low vapor pressure. The low melting point enables conversion of the metal into the fluid state at a reasonably low temperature. The high boiling point and low vapor pressure enable fabrication of the seal without vaporization or distillation of the material at the temperatures and the pressure differentials between the exterior and interior of the vessel encountered in the evacuation process. In addition, the material employed is of such character that it alloys readily with the metallic members to be joined, and is a pure metal free from contamination. Contaminations may increase the vapor pressure of the material and also may be of such character as to distill into the vessel and deleteriously affect the internal elements.

In the fabrication of a seal in accordance with features of this invention, the layer of sealing material is of substantial area and is maintained thin at all times. During the formation of the joint or seal, the pressure on the exterior of the vessel becomes considerably greater than that interior of the vessel so that a pressure differential exists at the joint, and, inasmuch as the sealing material is for a time in a fluid state, the formation of channels therein may occur with resultant leaks in the joint formed. The possibility of the formation of such channels becomes greater as the layer increases in thickness. Also, inasmuch as the length of possible leakage paths is dependent upon the area of the layer of sealing material, this layer should be of considerable area to preclude short possible leakage paths.

In order further to avoid the formation of leakage paths, in accordance with a feature of this invention the members being joined are pressed together with a pressure that increases as the temperature increases so that in the fabrication of the seal concurrently with the evacuation of the tube, the effectiveness of the seal increases as the temperature increases and the pressure within the vessel decreases.

In a specific and preferred embodiment of this invention, an enclosing vessel of an electron discharge device comprises a tubular copper member to the ends of which copper closure plates are hermetically sealed by a sealing element including layers of pure tin. Tin is particularly suitable in that it alloys readily with copper, has a low melting point, 231° C., a high boiling point, 2260° C., and a low vapor pressure, $1 \times 10^{-4}$ millimeters of mercury at 1000° C. In the fabrication of the device, the portions of the tubular member and closure plates to be joined are coated with a layer of pure tin, for example of the order of .001 inch thick. The tin coatings may be produced by electroplating or in other ways. For example, pure tin may be applied to the heated copper members together with a suitable flux and the assembly then wiped to leave only a very thin and smooth surface coating of tin. A washer in the form of a flat ring of metal that alloys readily with tin, such as gold, silver or copper, is interposed between the tin coated portions, and the several elements are then rigidly clamped together by a suitable jig or clamp including clamping elements having a lower temperature coefficient of expansion than the tubular member and end closure plates. The assembly is then heated, as by placing it in a suitable electric oven, and the vessel exhausted, during which process the tin alloys with the tubular member, closure plates and washer. It will be appreciated that inasmuch as the clamping elements have a lower temperature coefficient of expansion than the members being joined, as the temperature increases the pressure between the members being joined increases.

The invention and the above-noted and other features thereof will be understood more clearly from the following detailed description with reference to the accompanying drawing in which:

Fig. 1 is a sectional exploded view of an enclosing vessel of an electron discharge device, showing the relation of the elements before assembly and sealing in accordance with this invention;

Fig. 2 is a fragmentary view in section showing the relation of the elements of the seal before the application of heat and pressure thereto; and Fig. 3 is a perspective view illustrating the parts assembled in a jig preparatory to the evacuation and sealing process.

In order to simplify the drawing, the electrodes housed by the enclosing vessel have not been shown. It will be understood, of course, that various electrode constructions and arrangements may be employed.

Referring now to the drawing, the enclosing vessel comprises a tubular portion 1, for example of copper, and end closure plates 2 also, for example, of copper, each having a flange 3 formed by cutting away a portion of the plates to provide a shoulder of a diameter such that it makes a tight fit with the inner wall of the enclosing vessel, as shown in Fig. 2. Sealed to the tubular member 1 are a plurality of metallic tubulatures 5 which may be sealed hermetically at their outer ends by vitreous caps 11, two of which are shown, fused thereto. One of these tubulations serves as an exhaust opening and the others may have electrode supports or leading-in conductors joined thereto.

The end surfaces of the tubular member 1 and the inner surfaces of the flanges 3 are thoroughly cleaned and any oxide coating thereon is removed. These surfaces are then provided with thin coatings 10 of sealing material such as pure tin, for example by electroplating. Interposed between each pair of coatings 10 is an annular washer in the form of a thin flat ring of a metal that alloys readily with the material of the coatings 10. In the case where the coatings 10 are tin, the washers, in a particularly satisfactory structure, are of gold ribbon .002 inch in thickness, although other metals, for example, silver or copper, may be utilized.

In another form, the coatings 10 may be omitted and the washers 4 may be coated with the sealing material. For example, gold washers may be coated with pure tin by electroplating. When a coated washer is employed, the end surfaces of the member 1 and the inner surfaces of the flanges 3 are cleaned thoroughly and any oxide thereon removed as in the case where the coatings 10 are applied to these surfaces.

The parts to be sealed are then assembled in the relation shown in Fig. 2 and clamped in a jig or clamp formed by the plates 6 and the bolts 7. The bolts are of a material having a coefficient of expansion substantially less than that of the members 1 and 2, with the result that as heat is applied the clamping action and consequently the external pressure on the seal is increased. If the members 1 and 2 are of copper the bolts 7 may be of stainless steel. After the parts have been assembled in the jig a suitable connection is made to a vacuum pump through one of the tubulatures 5 and heat is applied to the assembly. As the temperature is gradually raised to the melting point of the sealing material 10 a slight leakage takes place as the pressure is at the same time being reduced in the tube or container. However, when the sealing material enters the liquid phase, the material wets the surfaces of the washers 4. It is important at this and succeeding stages of the process that the layers of sealing material be very thin, as too thick a layer may provide a sufficiently low impedance path to the vacuum side or interior of the vessel resulting in the formation of capillary or leakage paths through the layers. The surface of these capillaries may become oxidized and make it difficult to produce a hermetic seal. As the temperature is increased and the pressure within the container is decreased, the sealing material alloys with the washers 4 and the members 1 and 2. The melting point of the alloy is greater than that of tin. When a temperature of the order of 450° C. is reached the pumping operation is completed, the exhaust tubulature is sealed, the assembly is permitted to cool to room temperature, and the clamp is removed. Because the metal, e. g. pure tin, used in forming the seal has a high boiling point and low vapor pressure, contamination of the interior of the container is avoided, as there is no tendency for the metal to vaporize at the pressures and temperatures to which it is subjected in the process of forming the seal.

In some cases the washers 4 may be omitted and the seals formed in the same manner as described above, the sealing material alloying with the metallic members 1 and 2.

Although a specific embodiment of the invention has been illustrated and described, it will be understood that modifications may be made therein without departing from the scope and spirit of this invention as defined in the appended claims.

What is claimed is:

1. In the manufacture of a hermetically sealed highly evacuated container including a hollow cylindrical copper body and a copper closure disc sealed to one end of said body, the method which comprises interposing between juxtaposed annular surface portions of said body and said disc an annular sealing medium composed of an intermediate thin layer of gold and outer extremely thin layers of substantially pure tin, securing said disc to said end of said body with said sealing medium between said surface portions, by clamping means having a lower coefficient of expansion than copper, concurrently evacuating said container and heating the assembly composed of said body, disc and clamping means to alloy said tin with both said gold layer and said copper body and disc, and sealing said container.

2. In the manufacture of a hermetically sealed highly evacuated container including a hollow cylindrical copper body and a copper closure disc joined hermetically to one end of said body, the method which comprises interposing between juxtaposed annular surface portions of said body and disc an annular washer of gold of the order of .002 inch thick and coated on opposite faces with layers of pure tin of the order of .001 inch thick, securing said disc to said body with said washer between said surface portions by clamping means having a coefficient of expansion materially lower than that of copper, concurrently evacuating said container and heating the assembly composed of said body, disc and clamping means to a temperature of the order of 450° C., whereby said tin coatings alloy with said gold washer, copper body and copper disc under increasing pressure to hermetically join said disc to said body, and sealing said container.

3. In the manufacture of a hermetically sealed highly evacuated container including a cylindrical copper body and a copper closure disc joined hermetically to one end of said body, the method which comprises coating juxtaposed annular surface portions of said body and disc with layers of substantially pure tin of the order of .001 inch thick, interposing between said coated surface portions an annular washer of gold of the order of .002 inch thick, securing said disc against said body with said washer interposed between said coated surface portions, by clamping means having a coefficient of expansion materially lower than that of copper, concurrently evacuating said container and heating the assembly composed of said body, disc and clamping means to a temperature of the order of 450° C. whereby said tin is alloyed under increasing pressure with said body, disc and washer to hermetically join said disc to said body, and sealing said container.

VICTOR L. RONCI.